United States Patent
Nelson et al.

(10) Patent No.: US 6,692,704 B2
(45) Date of Patent: Feb. 17, 2004

(54) NON-THERMAL PLASMA REACTOR AND METHOD-STRUCTURAL CONDUCTOR

(75) Inventors: David Emil Nelson, Waterford, MI (US); Bob X. Li, Grand Blanc, MI (US); Mark David Hemingway, Columbiaville, MI (US); Suresh Baskaran, Kennewick, WA (US); Joachim Kupe, Davisburg, MI (US); Gregory Stephen Sims, Detroit, MI (US); Delbert L. Lessor, Richland, WA (US); Carl Elmer Miller, Millington, MI (US); Darrell R. Herling, Kennewick, WA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/812,071

(22) Filed: Mar. 19, 2001

(65) Prior Publication Data

US 2002/0131916 A1 Sep. 19, 2002

(51) Int. Cl.⁷ .................................................. B01J 19/08
(52) U.S. Cl. .................................................. 422/186.04
(58) Field of Search ..................................... 422/186.04

(56) References Cited

U.S. PATENT DOCUMENTS

| | | | | |
|---|---|---|---|---|
| 5,637,198 A | * | 6/1997 | Breault | 422/186.04 |
| 6,139,694 A | * | 10/2000 | Rogers et al. | 204/177 |
| 6,146,599 A | * | 11/2000 | Ruan et al. | 422/186.04 |

* cited by examiner

*Primary Examiner*—Kishor Mayekar
(74) *Attorney, Agent, or Firm*—Jimmy L. Funke (57) ABSTRACT

A non-thermal plasma (NTP) reactor structural conductor element includes a base conductor support and a high dielectric constant ("high k") barrier layer supported by and substantially surrounding the base conductor support to form a structural conductor NTP reactor element. The structural conductor element may comprise a variety of shapes such as plates, sheets, half-box, I shapes, C shapes, or comb shapes, among others. In one embodiment, the dielectric barrier layer includes a coating applied to the base conductor support. In another embodiment, the dielectric barrier layer includes a high k film laminated to the base conductor support. In yet another embodiment, the base conductor support integrally forms the dielectric barrier layer via conversion of surfaces of the base conductor using electrochemical, thermal or chemical means to form the dielectric barrier layer.

14 Claims, 10 Drawing Sheets

NON-THERMAL PLASMA REACTOR AND
METHOD-STRUCTURAL CONDUCTOR

TECHNICAL FIELD

The present invention relates to non-thermal plasma reactors and more particularly relates to structural conductor elements for non-thermal plasma reactors.

BACKGROUND OF THE INVENTION

Certain compounds in the exhaust stream of a combustion process, such as the exhaust stream from an internal combustion engine, are undesirable in that they must be controlled in order to meet government emissions regulations, Among the regulated compounds are hydrocarbons, soot particulates, and nitrogen oxide compounds (NOx). There are a wide variety of combustion processes producing these emissions, for instance, coal-or oil-fired furnaces, reciprocating internal combustion engines (including gasoline spark ignition and diesel engines), gas turbine engines, and so on. In each of these combustion processes, control measures to prevent or diminish atmospheric emissions of these emissions are needed.

Industry has devoted considerable effort to reducing regulated emissions from the exhaust streams of combustion processes. In particular, it is now usual in the automotive industry to place a catalytic converter in the exhaust system of gasoline spark ignition engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to Water and carbon dioxide and to reduce nitrogen oxides to nitrogen. The catalyst system is applied to a ceramic substrate such as beads, pellets, or a monolith. When used, beads are usually porous, ceramic spheres having the catalyst metals impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be pre-coated with gamma-alumina and other specialty oxide materials to provide a durable, high surface area support phase for catalyst deposition. The honeycomb shade, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a spark ignition engine is operating under stoichiometric conditions or nearly stoichiometric conditions (referred to as non-oxidizing conditions or as producing a non-oxidizing atmosphere) with respect to the fuel-air ratio (just enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system.

However, it is desirable to operate the engine at times under lean burn conditions, with excess air (referred to as oxidizing conditions or as producing an oxidizing atmosphere), in order to improve fuel economy. Under lean burn conditions, conventional catalytic devices are not very effective for treating the NOx in the resulting oxygen-rich exhaust stream.

The exhaust stream from a diesel engine also has a substantial oxygen content, from perhaps about 2–18% oxygen, and, in addition, contains a significant amount of particulate emissions. The particulate emissions, or soot, are thought to be primarily carbonaceous particles. It is also believed that other combustion processes result in emissions that are difficult or expensive to control because of, for instance. dilute concentrations of the compounds to be removed from the effluent stream or poor conversion of the compounds using conventional means.

In spite of efforts over the last decade to develop a effective means for reducing NOx to nitrogen under oxidizing conditions in a spark ignition. gasoline engine or in an diesel engine, the need for improved conversion effectiveness has remained unsatisfied. Moreover, there is a continuing need for improved effectiveness in treating emissions from any combustion process, particularly for treating the soot particulate emissions from diesel engines.

An alternative way to treat the hydrocarbon, particulate, or NOx emissions in an exhaust or effluent stream. would be to destroy such emissions using a non-thermal plasma. Plasma is regarded as the fourth state of matter (ionized state of matter) Unlike thermal plasmas, non-thermal plasmas (NTPs) are in gaseous media at near-ambient temperature and pressure but have electron mean energies considerably higher than other gaseous species in the ambient environment. NTP species include electrically neutral gas molecules, charged particles in the form of positive ions, negative ions, free radicals and electrons, and quanta of electromagnetic radiation (photons). These NTP species are highly reactive and can convert hazardous gases to non-hazardous or less hazardous and easily managed compounds through various chemical reaction mechanisms. In contrast to, thermal processes (such as thermal plasma), an NIP process directs electrical energy to induce favorable gas chemical reactions, rather than using the energy to heat the gas. Therefore, NTP is much more energy-efficient than thermal plasma.

NTPs can be generated by electric discharge in the gas or injection of electrons into the gas by an electron beam. Electron beams must be accelerated under a high vacuum and then transferred through special windows to the reaction site. The reaction site must be sized with respect to the penetration depth of the electrons. It is much more difficult to scale-up the size of an electron beam reactor than an electric discharge reactor. Therefore, electron beam reactors are less favored than electric discharge reactors.

Among the various types of electric discharge reactors, pulse corona and dielectric barrier (silent) discharge reactors are very popular for their effectiveness and efficiency. However, pulse corona reactors have the major disadvantage of requiring special pulsed power supplies to initiate and terminate the pulsed corona. Consequently, dielectric barrier discharge has become a fast growing technology for pollution control.

Cylindrical and planar reactors are to common configurations for dielectric barrier discharge reactors. Both of these configurations are characterized by the presence of one or more insulating layers in a current path between two metal electrodes, in addition to the discharge space. Other dielectric barrier discharge reactors include packed-bed discharge reactors, glow discharge reactors, and surface discharge reactors.

Current dielectric barrier discharge NTP reactor designs are based upon the use of one or more structural dielectric ceramic pieces coated with a conductive material arranged to form. dielectric barrier-conductor-dielectric barrier configurations. Reactor assembly generally comprises providing electrical. connections to the prepare element, which is typically wrapped with a mat, stuffed into a cylindrical housing or a housing half shell and secured thereto. A stacked shape non-thermal plasma reactor and element for use with diesel engines and the like is disclosed in commonly assigned U.S. patent application Ser. No. 09/511,590 (Attorney Docket No. DP-300505) entitled "Design and Method of Manufacturing A Plasma Reactor For Treating Auto Emissions—Stacked Shapes", which is hereby incorporated by reference herein in its entirety. Disclosed therein is a non-thermal plasma reactor prepared from a formed shape of dielectric. material used as a building block for creating the region of the non-thermal plasma reactor wherein plasma is generated. The formed shape defines an internal cell in the plasma reactor having an exhaust passage for flowing exhaust gas to be treated therethrough. A conductive print forming an electrode and connector is disposed on at least one wall of each of the cells. and outer insulative plates, disposed on opposite ends of the multi-cell stack, are provided to protect the conductive print.

Problematically, structural ceramic substrates provide relatively poor dimensional control with respect to thickness and camber. For example, dimensional thickness and camber of ceramic substrates may vary, such as from +/−10% and +/−0.4%, respectively, resulting in variations in dielectric barrier thickness and gaps. This dimensional variation limits the practical operating range for the non-thermal plasma reactor in applications such as after-treatment of diesel exhaust emissions.

Commonly assigned U.S. patent application Ser. No. 09/741,764 now U.S. Pat. No. 6,537,507 (Attorney Docket No. DP-302475) entitled "Non-Thermal Plasma Reactor Design And Method-Single Structural Dielectric Barrier", which is hereby incorporated by reference herein in its entirety, discloses a single structural dielectric barrier non-thermal plasma reactor element prepared with structural ceramics. The reactor includes an element having at least one cell comprising a conductor forming an electrode and connector, an exhaust passage for flowing gas there through, and a single structural dielectric barrier, so that during reactor operation, a non-thermal plasma is formed in the exhaust passages for treating fluid as it passes through the exhaust passages. Individual cells of the element comprise a conductor-single structural dielectric barrier-exhaust passage-conductor arrangement.

Structural ceramics comprise a significant portion of the cost factor for current NTP reactor designs based on structural ceramics. In addition, ceramic materials typically used for such applications, including cordierite, mullite, and alumina, have mid-level dielectric constants in the range of about 5.3 to about 10, limiting the ability to reduce the overall size of the NTP reactor What is needed in the art is an improved NTP reactor and method that can be manufactured at reduced cost while meeting application performance and durability requirements.

SUMMARY OF THE INVENTION

The present non-thermal plasma reactor has a structural conductor element comprising a base conductor support; and a high dielectric constant ("high k") barrier layer supported by and substantially surrounding the base conductor support to form a structural conductor non-thermal plasma reactor element. The dielectric barrier layer may comprise a double dielectric barrier or a single dielectric barrier. Embodiments comprising a single dielectric barrier are advantageous for providing low, cost fabrication, high, power per area reactor performance, and compact construction. However, embodiments comprising a double dielectric barrier are considered to have slightly higher constituent conversion efficiency than for the single dielectric barrier embodiments.

The structural conductor element may comprise a variety of shapes including plates or sheets, half-box shapes (C-shapes), or comb shapes combined to provide inter-digitized tine elements, among others.

The dielectric barrier layer comprises a material applied to the base conductor support, such as by coating or laminating. In an alternate embodiment, the dielectric barrier layer is formed by converting the base conductor support via electrochemical. thermal or chemical methods to form a dielectric barrier layer from outer surfaces of the base conductor support.

The present invention provides non-thermal plasma reactors comprising a multi-cell stack of structural base conductor elements, including, but not limited to, structural base conductor plates, C-shaped structural base conductors, and inter-digitized tine shaped elements. The inter-digitized tines have rounded corners and are prepared from comb-shaped structural base conductors.

The present structural conductor NTP reactors may be used in a variety of applications wherein NOx reduction is desired, including, but not limited to, industrial NOx reduction abatement applications and transportation applications such as mobile diesel applications.

Advantageously, the high k dielectric barrier layer on the structural conductor base increases the capacitance of the NTP reactor, with respect to prior NTP reactor designs using structural ceramics as the conductor support, due to reduced dielectric barrier thickness and higher k level.

Advantageously, the present structural conductor NTP reactors provide improved dimensional control and lower dielectric material and manufacturing costs.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Exemplary embodiments of the structural conductor NTP reactors of the present invention are further described with respect to the several Figures. The structural base conductor element comprises a high dielectric constant ("high k") barrier layer disposed upon and supported by a base conductor. The dielectric barrier layer may comprise a high k coating or laminate disposed upon the base conductor or a high k barrier layer formed by treating the base conductor to render surfaces of the base conductor a high k dielectric barrier.

Preferably, the dielectric barrier layer has a dielectric strength of about 1000 volts/mil or greater. In addition, the dielectric barrier layer preferably has a low surface energy in its finished condition so as to reduce the affinity of contaminants to deposit onto the barrier layer thus causing performance degradation over time.

The base conductors may be of any shape suitable for the intended application, including, but not limited to, plates or sheets, half-box shapes (C-shapes), or comb shades.

Any material having sufficient electrical conductivity and structural mechanical characteristics may be used to form the base conductor. Exemplary materials suitable for forming the base conductor include, but are not limited to, aluminum, copper, nickel, titania. ceramic metal (cermet), $LaCrO_3$. $LaMO_3$, low-expansion iron-nickel alloys, steel, stainless steel, among other materials providing suitable electrical conductivity and structural mechanical characteristics. Preferably, the base conductor comprises a material having a similar coefficient of thermal expansion as the selected high k dielectric barrier layer (or layers in double dielectric barrier embodiments) to allow robust high temperature operation.

One embodiment of the present invention comprises preparing the structural base conductors by applying a material having a high dielectric constant (referred to herein as a "high k" coating) to the base conductor to form a structural base conductor. Coating thickness is determined in accordance with the dielectric strength of the selected high k coating, the maximum anticipated operating voltage, along with other factors specific to the intended application, such as safety factors. Robust protection against dielectric breakdown during reactor operation may be achieved with thin coatings of about 5 mil using materials having a dielectric strength of about 1000 volts/mil or greater.

Suitable high k coatings include, but are not limited to, materials based upon oxides such as bismuth titanate, bismuth niobium titanate, barium strontium titanate, and other high k oxides. Preferably the oxides have high-k level with little change in k level over the useful temperature range of the NTP reactor application. Metal oxide dielectrics are often combined with a binding agent (such as ethyl cellulose) as an application aid.

Any suitable method may be employed for applying the high k coating to the base conductor, including, but not limited to, spraying, dipping, spin. coating, screen printing, and stencil printing, chemical vapor deposition, plating, laminating, among others.

Figures 1A, 1B:
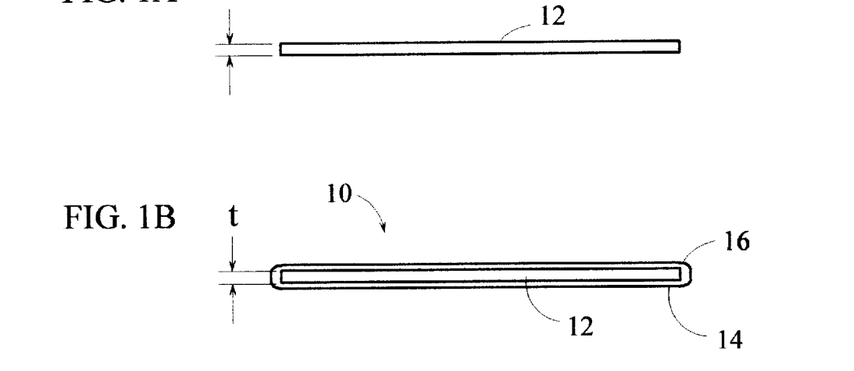
FIG. 1A shows a cross section of a base conductor support prior to coating.
FIG. 1B shows a cross-section of a structural base conductor formed by coating the conductor of FIG. 1A with a high k coating.

Turning now to FIGS. 1A and 1B, one possible embodiment of the present invention comprising a structural conductor 10. FIG. 1A shows a cross section of a base conductor support 12 prior to coating. FIG. 1B shows a cross section of a structural conductor 10 formed by coating the base conductor 12 with a high k coating to form high k dielectric barrier 14. In a preferred embodiment, structural conductor support 12 comprises rounded corners 16 to allow uniform charge distribution. during NTP reactor operation.

In an alternate embodiment in accordance with the present method, outer surfaces of the base conductor may be converted into a high k barrier layer. Converting maybe accomplished using known electrochemical, thermal or chemical methods. For example, a base conductor comprising sintered conductive titanate may be thermally oxidized to form a high k barrier surface layer on the base conductor. Alternately, a base conductor of aluminum may be electrochemically treated to form a dielectric barrier surface layer of alumina. Such electrochemical converting provides a continuous, highly reliable, self-healing type barrier layer due to the insulating nature of the formed alumina barrier layer. This creates a high driving force resulting in substantially complete coverage of the base conductor with high k dielectric barrier layer.

Figure 2A:
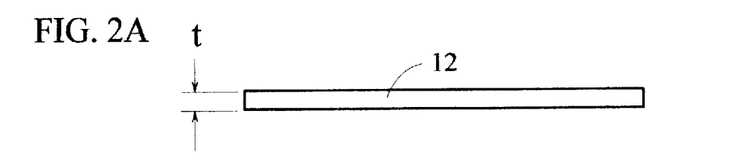
FIG. 2A shows a cross section of a base conductor support prior to conversion.
Figure 2B:
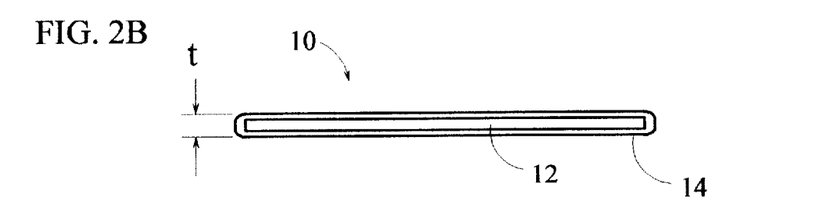
FIG. 2B shows a cross section of a structural base conductor formed via conversion of the base conductor support of FIG. 2A.

Turning to FIG. 2A, a cross-section of base conductor support 12 is shown prior to converting. FIG. 2B provides a cross sectional view of a structural conductor 10 formed by converting surfaces of the base conductor support 12 to form a high k dielectric barrier layer 14.

Alumina barrier layers formed through electrochemical or thermal processes provide excellent bonding surfaces. Optionally, a high bonding surface such as alumina may be formed prior to coating or forming the high k barrier layer, thus providing a highly reliable bond.

In an alternate embodiment, the present structural conductor NTP reactor elements may comprise multiple layers, having at least one layer comprising a high k barrier layer. In a preferred embodiment, each layer in the multiple layer configuration has high dielectric strength or is provided at a thickness sufficient to withstand applied voltage during operation (typically about 5000 volts).

Figure 3A:
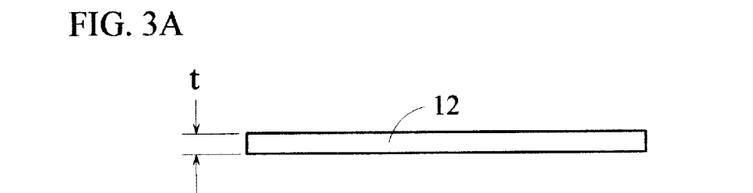
FIG. 3A shows a cross section of a base conductor support prior to applying a high k dielectric barrier layer via lamination.
Figure 3B:
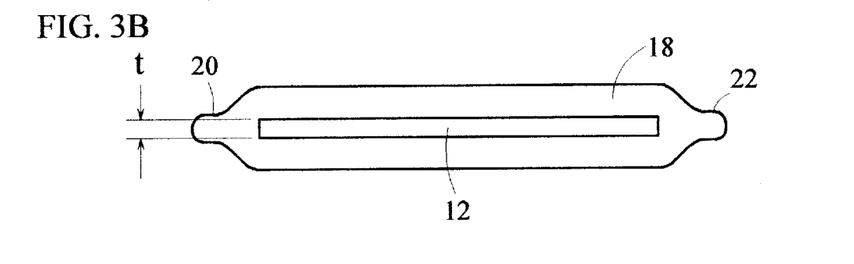
FIG. 3B shows a cross section of a structural base conductor formed via lamination of a high k film to the base conductor of FIG. 3B.

In another embodiment, the structural conductor may be prepared by laminating a high k material to the base conductor. FIG. 3A shows cross section of a base conductor 12 prior to laminating. FIG. 3B shows a cross section of a structural base conductor 10 as formed via lamination of a high k dielectric film 18 onto each side of the base conductor 12 and to each other at side edges 20, 22.

Electrical connections are provided to connected the structural conductor through the high k barrier layer to other cells in the multi-cell stack comprising the reactor element, power sources, or ground. An edge of the base conductor may be masked prior to forming (via coating, converting, or laminating) the high k barrier.

Figure 4A:
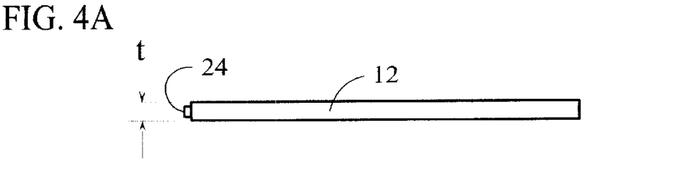
FIG. 4A shows a masked base conduct, or support before treating.
Figure 4B:
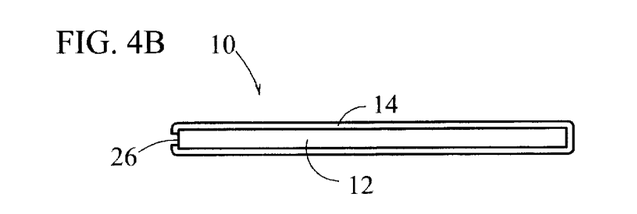
FIG. 4B snows a cross section of a structural base conductor after masking, treating to form a high k dielectric barrier, and removing the mask.

FIG. 4A provides a view of a base conductor 12 showing a typical placement of mask 24 prior to coating or converting. FIG. 4B shows a cross section of a structural conductor 10 after removal of the mask 24, with formed high k dielectric barrier layer 14 and resultant conductive terminal 26.

Figure 5:
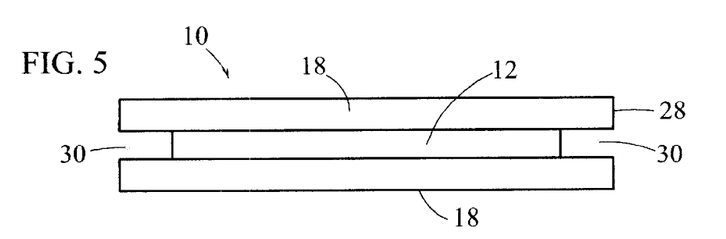
FIG. 5 shows a cross section of a structural base conductor plate having an integral laminate deflection barrier and terminal access.

Turning to FIG. 5, a structural conductor 10 prepared from a high k laminate 18 includes an integral high k laminate deflection flange 28 providing both dielectric barrier deflection function and access area 30 for electrical connection to the base conductor 12.

Figure 6:
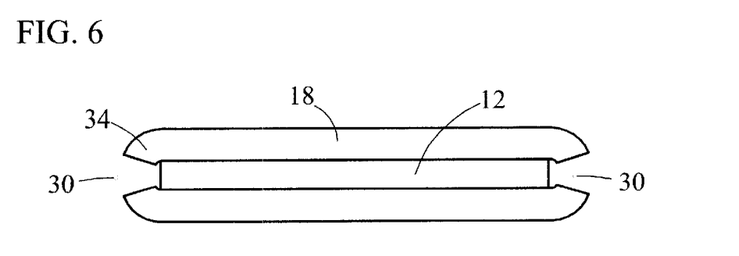
FIG. 6 shows a cross section of an alternate embodiment of a structural conductor plate having an integral laminate deflection barrier.

A preferred embodiment of such an integral laminate deflection flange 28 is shown in FIG. 6. In this embodiment, the structural conductor 12 comprises a plate shaped base conductor. The structural conductor is prepared by laminating high k dielectric film 18 having a preferred deflection flange profile 34 wherein the laminate 18 is partially closed at opposite, open ends 30 sufficient to minimize. the formation of fringing fields. Preferably, the swept region of the preferred deflection flange profile 34 comprises a constant thickness.

If desired, formation of the high k barriers may be delayed until the build sequence has progressed and multiple cells (if desired) have been assembled and base conductor connections have been prepared.

The structural conductor NTP reactors may be assembled using numerous methods to form a variety of shapes, including, but not limited to, stacked structural base conductor plates, stacked C-shaped structural base conductors, and inter-digitized tine shapes prepared from comb-shaped structural base conductors. One embodiment comprises assembling a plurality of structural conductor plates into a stack. separated by insulating spacers near the side edges of the structural conductor plates. Assembling comprises alternating the conductive edge region with each layer of structural conductor plates, so that opposite polarity electrical bus connections can be made along each side. Assembling further comprises securing components, such as with adhesive between structural conductor plates, adhesive along each side of the stack, or through a mechanical collar arrangement compressing the structural conductor plates together while allowing for thermal expansion in the most highly stressed sections of the stack. Assembly further comprises preparing electrical connections from conductive pads on edges of each structural conductor plate to side bus paths, power and ground.

In a preferred embodiment, assembly comprises providing additional electrical insulation near the stack edges to protect the edges of a coated, converted layer from arcing to another oppositely charged plate. Any known method may be employed to provided additional insulation. In one embodiment, assembly comprises applying an encapsulent to the stack edges, such as by gluing a dielectric layer to the structural conductor edges, to increase the effective distance between layers from the edges. Assembly may include disposing an. insulating cover plate, encapsulent, or other insulating material on one end of the stack to further protect against arcing.

Figure 7:
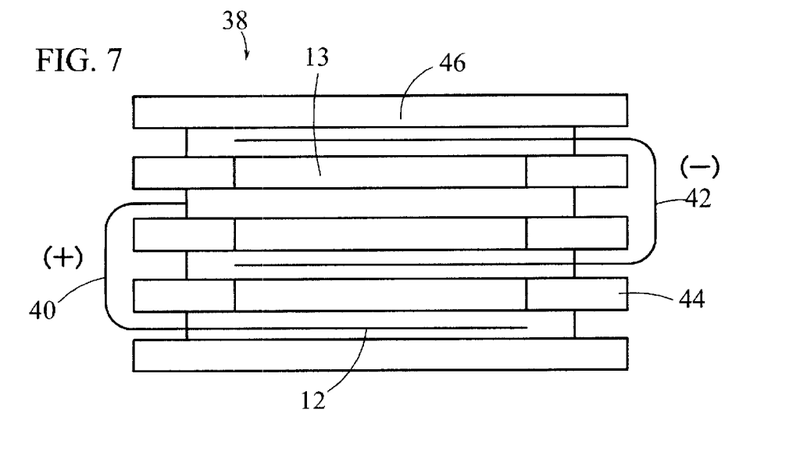
FIG. 7 shows a cross section of a multi-cell stack having electrical connections provided via offset spacers.

FIG. 7 shows a cross section of a multi-cell planar stack 38 including structural base conductors 12 disposed on either side of exhaust passages 13. Positive power bus connection 40 and negative ground bus connection 42 are alternately disposed on the stack 38. Offset spacers 44 increase the effective distance between stack 38 layers from the stack edges. Cover plates 46 enclosed each end of the stack 38.

Figure 8:
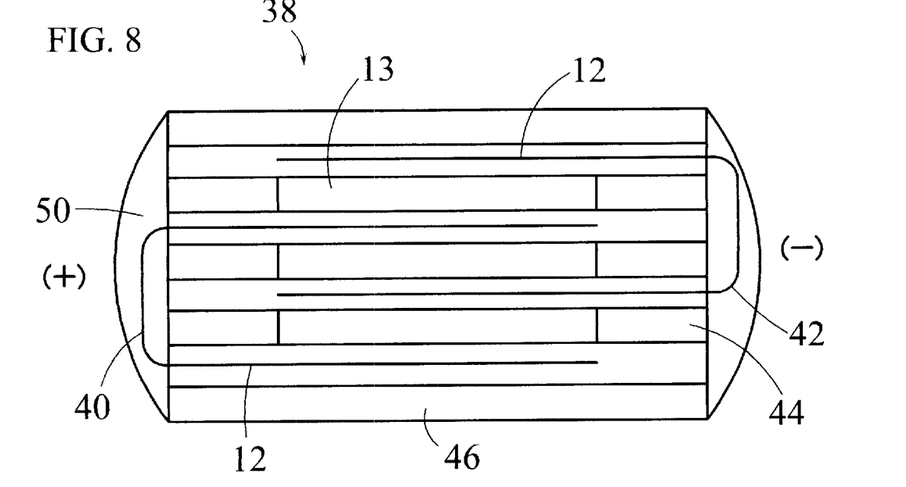
FIG. 8 shows a cross section of a multi-cell stack having electrical connections and encapsulent electrical insulation disposed on opposite sides of the stack.

FIG. 8 shows a cross section of a multi-cell planar stack 38 including structural base conductors 12 having electrical connections 40, 42, and encapsulent electrical insulation 50 disposed on opposite side edges of the multi-cell stack 38.

Figure 9:
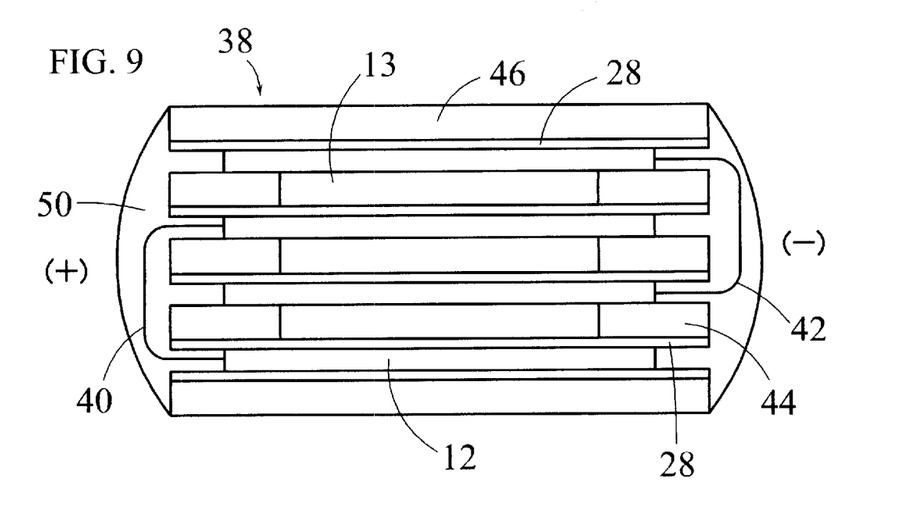
FIG. 9 shows a multi-cell stack of structural base conductor plates having deflection barriers, electrical connections and encapsulant electrical insulation disposed on alternate sides of the stack.

FIG. 9 shows a multi-cell planar stack 38 including structural conductor plates 12 having integral deflection barrier flanges 28, electrical connections 40, 42, and encapsulent electrical insulation 50 applied on the sides of stack.

In another alternate embodiment, the structural conductor NTP reactor is prepared using C-shaped (or half box shaped) structural conductors.

Figure 10:
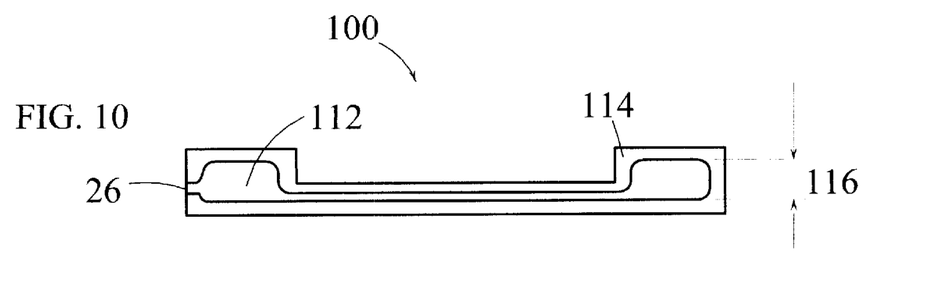
FIG. 10 shows a cross section of a C-shaped structural base conductor.

FIG. 10 In shows a cross section of a C-shaped structural. conductor 100 prepared using a C-shaped base conductor 112. In one embodiment, the C-shaped base conductor 112 is formed via extruding long lengths and cutting sections to the desired length. A base conductor having a C-shape configuration provides excellent structural support.

The height 116 of the C-shaped base conductor 112 may be determined in accordance with an optimization process. Due to the lower costs of the present structural conductor, the land height may be set at slightly lower than the point where electrical leakage may occur between (coated or converted) C-shaped structural base conductors and insulating spacers provided between adjacent C-shaped structural base conductors while maintaining cost effectiveness.

Figure 11:
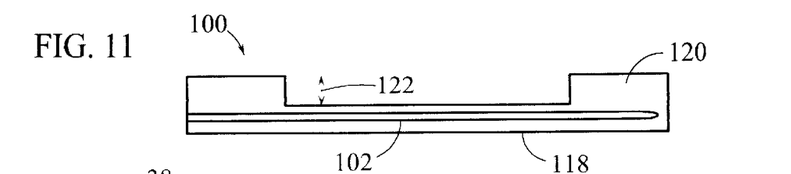
FIG. 11 shows a cross section of a shaped C-shaped structural conductor prepared by laminating high k layers and applying insulating spacers to a C-shaped base conductor.

FIG. 11 shows a cross section of a preferred embodiment of a C-shaped structural conductor 100 prepared by laminating high k barrier layers 118 together and to a fiat base conductor 102. Insulating lands 120 may be formed at each end as an integral part of the high k barrier layers 118 or may be discrete lands attached (as with adhesive The flat base conductor 102 may be prepared bay cold rolling, blanking into desired shape and chamfering edges and corners. C-shapes prepared in this fashion have sufficient thickness between base conductor and land extent near the edges to eliminate the need for an additional insulating layer between C-shaped components when stacked. In addition, when these C-shaped components are stacked. the land height 122 directly sets the exhaust passage gap.

Multi-cell NTP reactors comprising C-shaped structural conductors are assembled with C-shaped structural conductors stacked onto each other. An additional structural conductor plate is added to completely form the cells. The C-shaped structural conductors and plate are oriented so that conductive side terminals are aligned In an alternating pattern. Dielectric cover plates may be used on top and bottom ends of the NTP reactor stack to impart increased stack toughness and for improved electrical isolation.

C-shaped structural base conductors, structural conductor plates, and cover plates may be secured with adhesives between. dielectric layers near the sides or along the sides of the stack. Alternately, components may be secured using a mechanical collar arrangement that compresses the conductors together while allowing for thermal expansion in highly stressed sections. Electrical connections are made from the conductive side terminals of C-shaped structural conductors and plates to power and ground.

Figure 12:
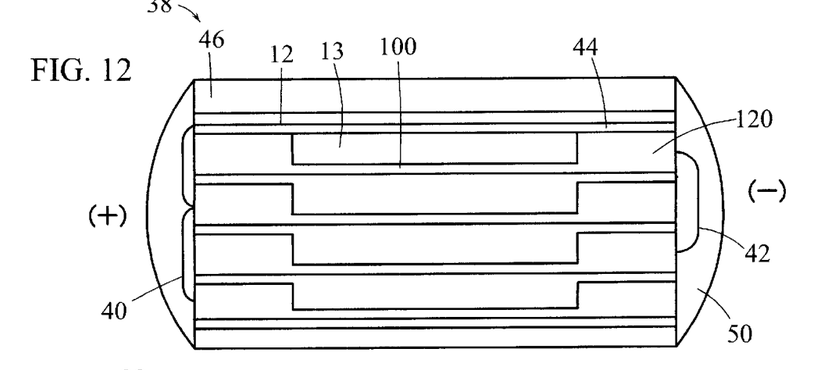
FIG. 12 shows a cross section of a multi-cell reactor element having C-shaped structural conductors and insulating spacers.

FIG. 12 shows a cross section of a multi-cell planar stack 38 having reactor elements comprising C-shaped structural conductors 100. Insulating spacers 44 are provided at each layer to prevent electrical leakage through the lands 120.

Figure 13:
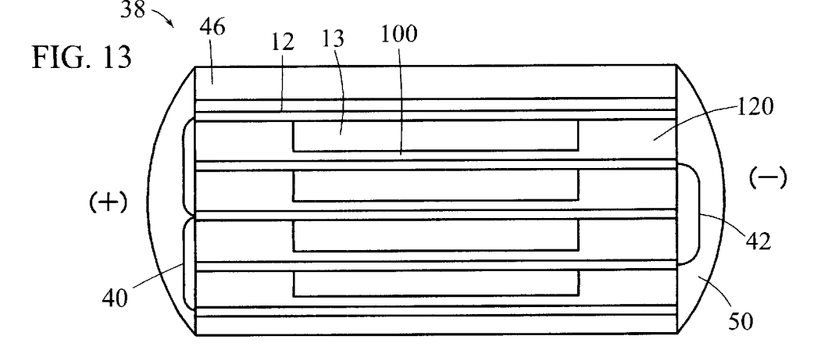
FIG. 13 shows a cross section of a multi-cell reactor element having C-shaped structural conductors with insulating lands

FIG. 13 shows a cross section of a multi-cell planar stack 38 comprising C-shaped structural conductors 100 prepared by laminating, grinding or other suitable method to form insulating lands 120. In this embodiment, insulating spacers are not required between base conductor layers. In this embodiment, the land height 122 directly sets the exhaust gap 13 height.

Figure 14:
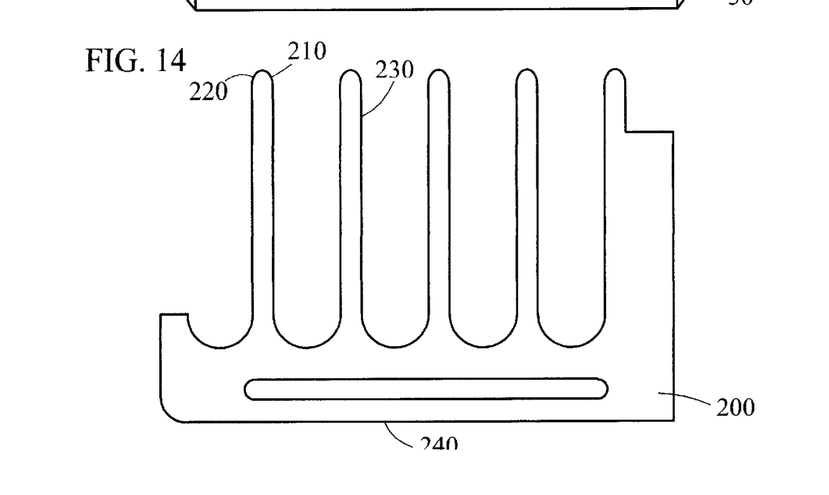
FIG. 14 shows a comb-shaped structural base conductor.

Another preferred embodiment comprises an inter-digitized tine arrangement of structural base conductors. FIG. 14 shows a comb-shaped structural base conductor 200. The tines 210 have rounded corners 220 to eliminated edge charge concentrations that could develop during operation. Rounded corners 220 further allow for excellent control of high k barrier layer formation during manufacturing. In addition, rounded corners 220 ease insertion and alignment of the comb-shapes during NTP reactor assembly. Preferably, thee comb-shape structural base conductor 200 is configured so that a second, substantially identical comb-shaped structural base conductor can be flipped over and inserted into the first comb-shape structural base conductor to the NTP reactor element. Further, this comb-shaped structural conductor configuration provides error-proof assembly in that reactor assembly can only occur when two comb-shaped structural base conductors are correctly oriented relative to one another.

Comb-shaped structural base conductors may be formed via extruding and cutting to length. The comb-side 230 of each comb-shaped structural base conductor is treated (e.g., coated, converted, or laminated) to provide the high k barrier layer. Surfaces of the comb-side region 230 are coated with a high k coating to form high k dielectric barrier layer. Exterior surface regions 240 do not require high k coatings. Therefore, optionally, the exterior surface region 240 of each comb-shape structural base conductor may be masked off at the desired locations prior to coating. Alternately, by delaying application of the exterior insulation coating until after the inter-digitized reactor element is assembled, the masking step may be eliminated.

Figure 15:
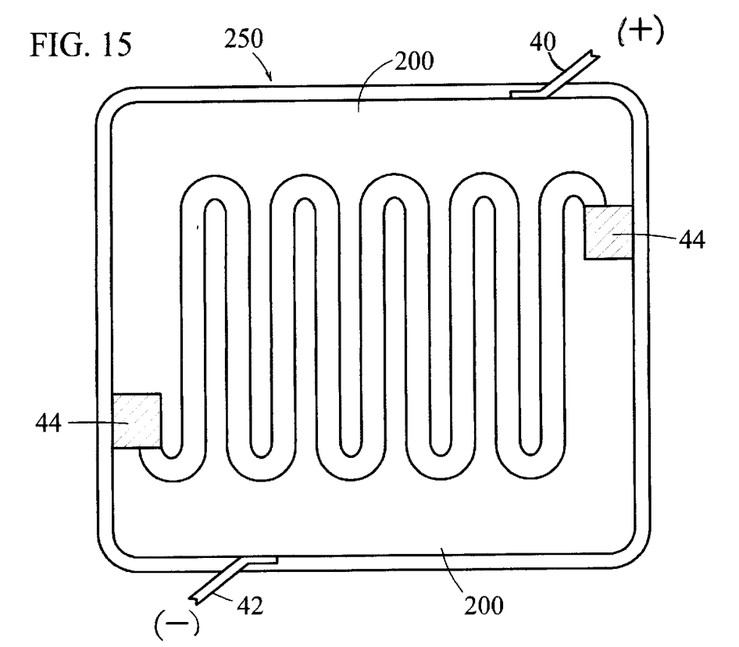
FIG. 15 shows an inter-digitized tine reactor element having comb-shaped structural base conductors.

FIG. 15 shows an inter-digitized tine reactor element 250 comprising comb-shaped structural based conductors 200. The inter-digitized tine reactor element may be prepared by inserting the comb-shaped structural base conductors 200 into one another, with two insulating spacers 44 disposed at joint interfaces to isolate each comb-shaped structural base conductor 200 from the other. Components are secured together such as with an adhesive disposed between the comb-shaped structural base conductors 200 and the insulating spacers 44 or with an adhesive applied along the sides of the reactor element. Alternately, a collar arrangement may be used to hold the components together. Electrical connections 40, 42 to power and ground are provided to the conductive terminal on each comb-shaped structural base conductor 200. Typically, electrically unshielded ground and shielded power cables are soldered, brazed, or welded directly to the exterior of each comb-shaped structural base conductor. Preferably, the exterior of the NTP reactor element, including electrical terminals, is coated with an insulating coating. Front and back faces of the NTP reactor may be coated with insulation material (leaving exhaust passages unplugged).

The inter-digitized tine reactor element 250 shown in FIG. 15 comprises a predominately, planar cell arrangement, exclusive of the ends where there exists a concentric cell orientation Such a configuration optimizes efficient use of cell space. However, operating plasma simultaneously across both planar and concentric cell regions may be difficult to control.

Figure 16:
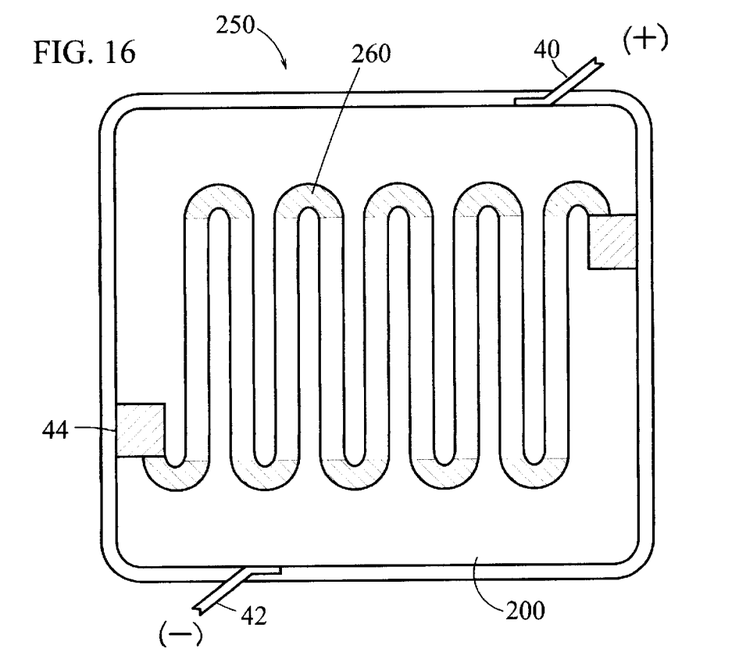
FIG. 16 shows an inter-digitized tine reactor element having comb-shaped structural base conductors and insulating guides.

FIG. 16 shows a preferred embodiment of an inter-digitized tine reactor element 250 having Insulating guides 260 disposed at the concentric regions of each tine. Insulating guides 260 enable enhanced control when operating plasma across the planar and concentric cell regions of this embodiment. Advantageously, this embodiment enables the widest operating margin when powered The insulating guides 260 further support each tine at the end of the cantilever to better create a repeatable tine location. Insulating guides 260 may comprise pre-positioned solid or semi-solid material Alternately, insulating guides 260 may be formed in situ, such as by applying an encapsulent insulating compound.

Optionally, the comb-shaped structural base conductors may be fabricated as a shaped tube. Such fabrication would have a similar boundary shaped as that shown in FIG. 14 but with a typical wall dimension of about 0.25 to about 25 millimeters. On the gas inlet side of the NTP reactor element, hollow regions may be covered with a structural metal or dielectric material to block flow through non-active parts of the NTP reactor element.

In a preferred embodiment, dielectric extensions are applied to ends of the inter-digitized tine NTP reactor element. The dielectric extensions cover the conductive tines and are sufficient to prevent voltage leakage between adjacent tines at the ends. The dielectric extension may be, for example, encapsulent coatings or solid dielectric materials.

Optionally, heaters may be disposed inside the shaped tube comb-shaped structural base conductors. Electrical connections may be provided through a hole that is drilled through a side of the shaped tube comb-shaped structural base conductors. The heater may be employed to heat up the NTP reactor to a temperature sufficient to burn off contaminants that may deposit on the wails of exhaust channels over time.

In an another embodiment of the present invention, non-thermal plasma reactors are provided having a single dielectric barrier per cell. The single dielectric embodiments are particularly advantageous for providing low cost fabrication, high power per area reactor performance, and compact construction. Turning now to FIGS. 17–32, various embodiments of the single dielectric barrier reactor will be described using 300 series reference numerals for plate and C-shaped embodiments and 400 series reference numerals for inter-digitized tine embodiments.

Figure 17:
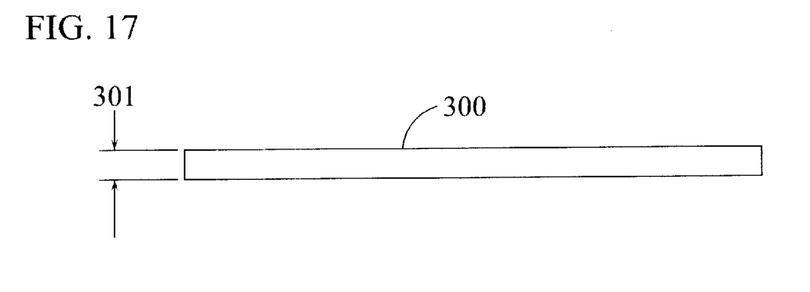
FIG. 17 shows a base conductor prior to coating to form a conductor-single dielectric barrier bi-layer in accordance with the single dielectric barrier embodiment of the present invention.

FIG. 17 shows a base conductor 300 having a thickness 301 prior to coating to form a conductor-single dielectric barrier bi-layer 302. A high k coating layer 304 is applied to one side of the base conductor 300 to form the bi-layer 302. Coating thickness is selected based upon the dielectric strength of the coating material, the maximum anticipated operating voltage, and other factors such as safety considerations.

Figure 18:
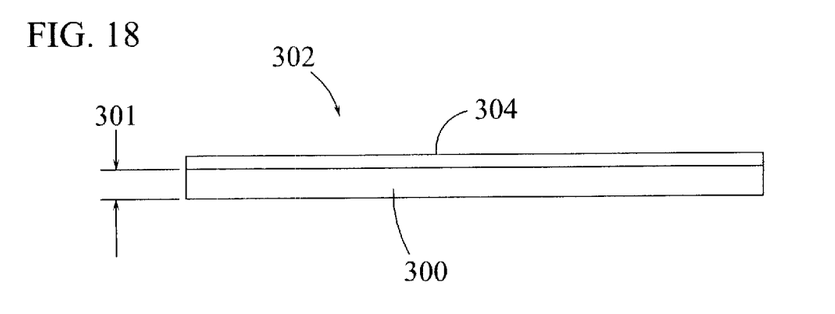
FIG. 18 shows the base conductor of FIG. 17 after coating.

FIG. 18 shows the base conductor 300 after coating. The high k dielectric barrier 304 increases the capacitance of the reactor over similar designs prepared with structural ceramics. High k coating materials suitable for the double dielectric barrier embodiments are also suitable for the single dielectric barrier embodiments.

Figure 19:
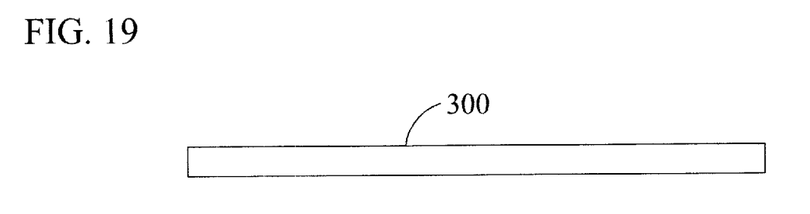
FIG. 19 shows a base conductor prior to converting to form a conductor-single dielectric barrier bi-layer in accordance with the single dielectric barrier embodiment of the present invention.
Figure 20:
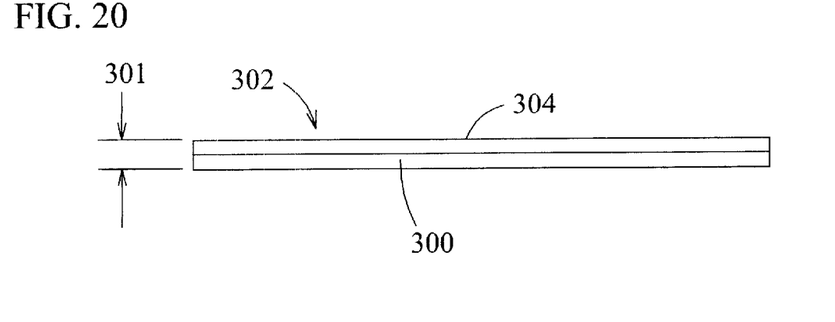
FIG. 20 shows the base conductor of FIG. 19 after converting.

In an alternate single dielectric barrier embodiment, outer surfaces of one side of the base conductor 300 are converted using suitable electrochemical thermal or chemical methods to convert the outer surfaces into a high k coating layer 304. FIG. 19 shows a cross-section of a base conductor 300 having a thickness 301 prior to converting to form a conductor-single dielectric barrier bi-layer 302. FIG. 20 shows a cross section of the base conductor 300 of FIG. 19 after converting having essentially the same thickness 301 as prior to converting providing a compact element. As with the double dielectric barrier embodiments, the single dielectric barrier elements may comprise multiple layers with one layer being a high k barrier layer.

Figure 21:
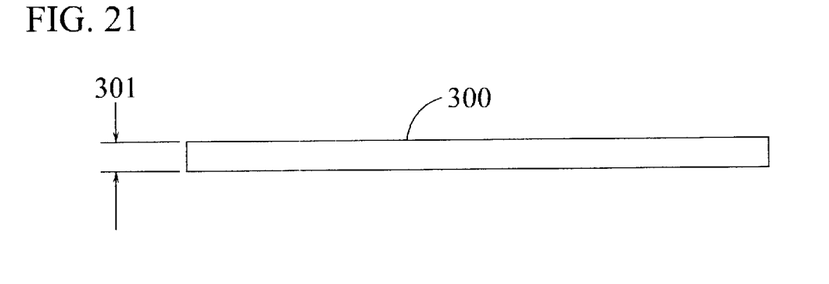
FIG. 21 shows a base conductor prior to laminating to form a conductor-single dielectric barrier bi-layer in accordance with the single dielectric barrier embodiment of the present invention.
Figure 22:
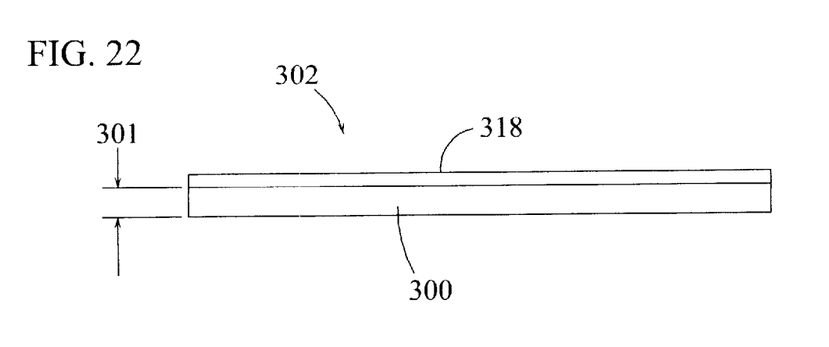
FIG. 22 shows the base conductor of FIG. 21 after laminating.

FIGS. 21 and 22 show a conductor-high k dielectric bi-layer 302 prepared by laminating high k dielectric film having suitable dielectric strength onto a side of a conductor 300.

Figure 23:
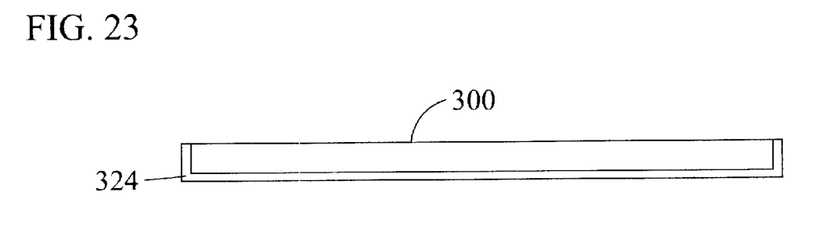
FIG. 23 shows a masked base conductor prior to treatment by coating or converting to form. a conductor-single dielectric barrier bi-layer in accordance with the single dielectric barrier embodiment of the present invention.
Figure 24:
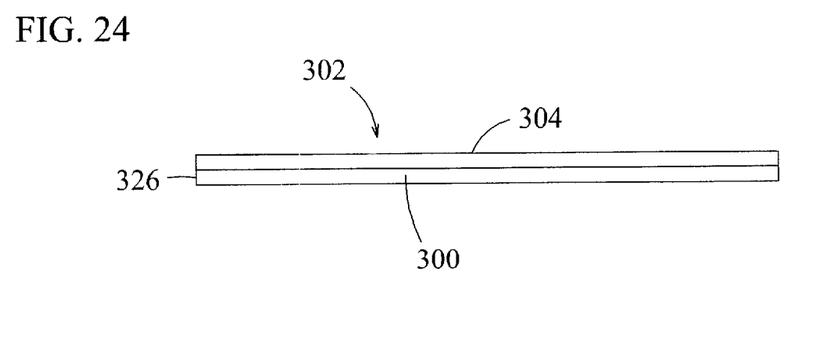
FIG. 24 snows the base conductor of FIG. 23 after treating to form a conductor-single high k dielectric barrier bi-layer embodiment of the present invention having a side terminal formed by masking prior to treating.

For all embodiments, irrespective of the method used to prepare the conductor-high k dielectric bi-layer 302, electrical connections are provided to the conductor 300 through the high k dielectric layer 304 or 318 to other cells of the element, power or ground. FIG. 23 shows masking 324 prior to coating, converting or laminating the conductor 300. FIG. 24 shows a conductor-high k dielectric bi-layer 302 prepared with a typical edge mask location providing plate terminal 326.

Figure 25:
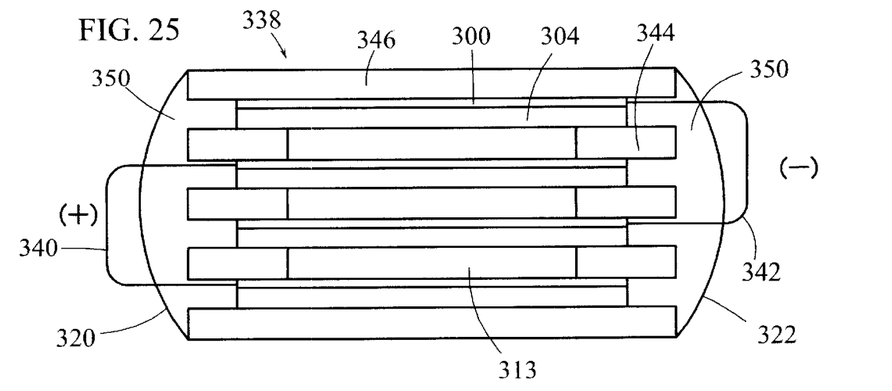
FIG. 25 shows a multi-cell stack in accordance with a single dielectric barrier embodiment of the present invention having electrical connections and offset spacers.

FIG. 25 shows a multi-cell planar stacked element 338 prepared with conductor-high k dielectric bi-layers 302 forming exhaust passages 313. Electrical connections 340 (positive) and 342 (negative) and offset spacers 344 increase the effective distance between layers 302 from the reactor edges 320, 322. The element 338 includes dielectric cover plates 346 and optional encapsulent insulation 350.

Figure 26:
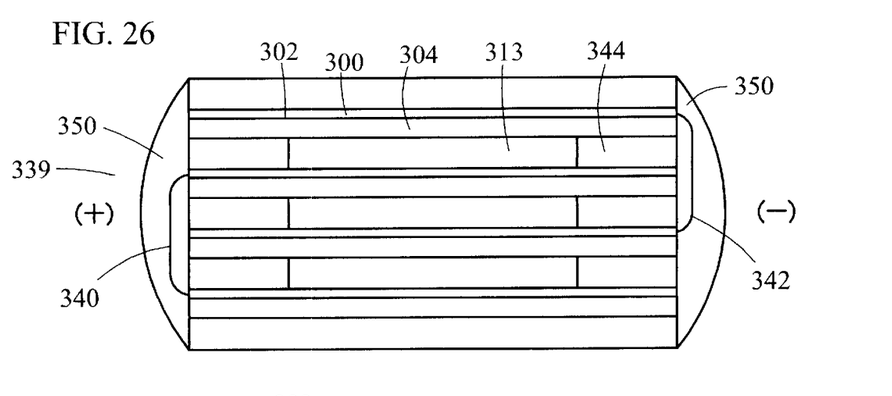
FIG. 26 shows a multi-cell stack in accordance with a single dielectric barrier embodiment of the present invention having electrical connections and offset spacers and encapsulent electrical insulation applied to sides of the stack.

FIG. 26 shows an alternate multi-cell planar stacked element 339 prepared similar to stacked element 338 shown in FIG. 25 except without offsetting dielectric spacers 344 and with required encapsulent insulation 350. Encapsulent insulation 350 is used on the sides of the element 339 to prevent charge leakage.

Figure 27:
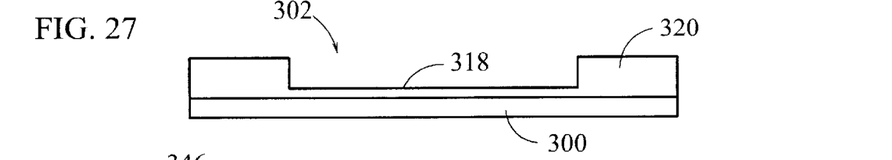
FIG. 27 shows a conductor-dielectric c-shape in accordance with a single dielectric barrier embodiment of the present invention prepared by laminating a high k dielectric layer to a base conductor and insulating.

FIG. 27 snows a conductor-dielectric C-shape bi-layer 302 prepared by laminating a high k dielectric laminate layer (e. g., high k film) 318 to a base conductor 300 and providing insulating lands 320 along the sides of the laminate 318.

Figure 28:
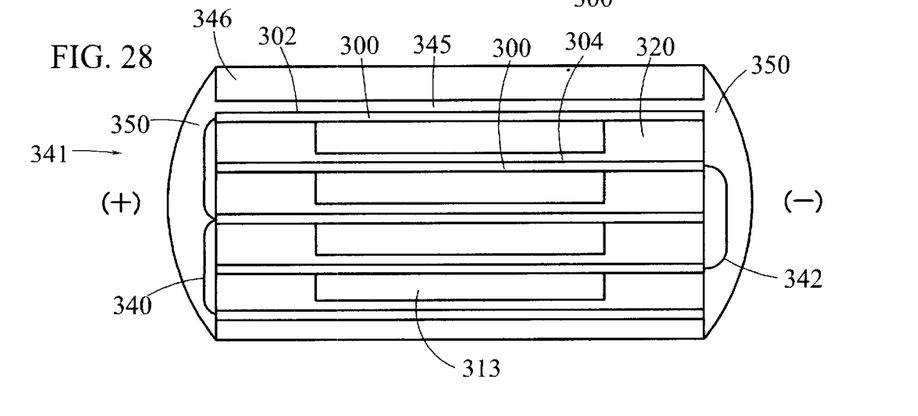
FIG. 28 shows a multi-cell reactor element in accordance with a single dielectric barrier embodiment of the present invention prepared with C-shaped and plate shapes conductor-dielectric bi-layers.

FIG. 28 shows a multi-cell planar stack 341 prepared with conductor-high k dielectric C-shaped bilayers 302. The C-shapes are fabricated by laminating, adhesive bonding, or other method to create insulating lands 320. Again, C-shape land height is selected to provide the desired exhaust passage 313 height for each cell when the reactor is assembled. Electrical encapsulent insulation 350 or a solid dielectric cover plate 346 is applied on each side of the stack 338 to prevent voltage leakage between adjacent cells. An optional insulating layer 345 may be disposed between the outermost structural conductor base 300 and the cover late 246.

Figure 29:
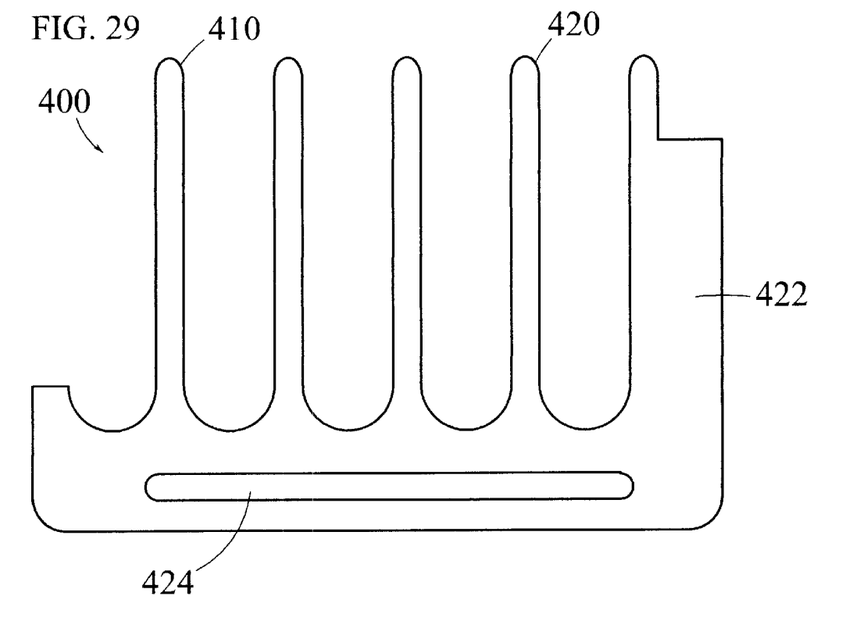
FIG. 29 shows a dielectric lower comb shape used to prepare an inter-digitized tine reactor element in accordance with a single dielectric barrier embodiment of the present invention.

In a preferred embodiment, an inter-digitized tine arrangement is employed comprising an alternating sequence of uncoated conductive tines and high k dielectric coated tines proving exhaust passages 413. FIG. 29 shows an uncoated comb shape conductor 400 ("lower" comb). The comb shaped conductor 400 has tines 410 with rounded ends 420, a grip side 422, and preferably, a low surface energy coating disposed on all tine 410 end surfaces. An optional heater slot 424 may be provided for disposing an electric heater used to regenerate the reactor.

Figure 30:
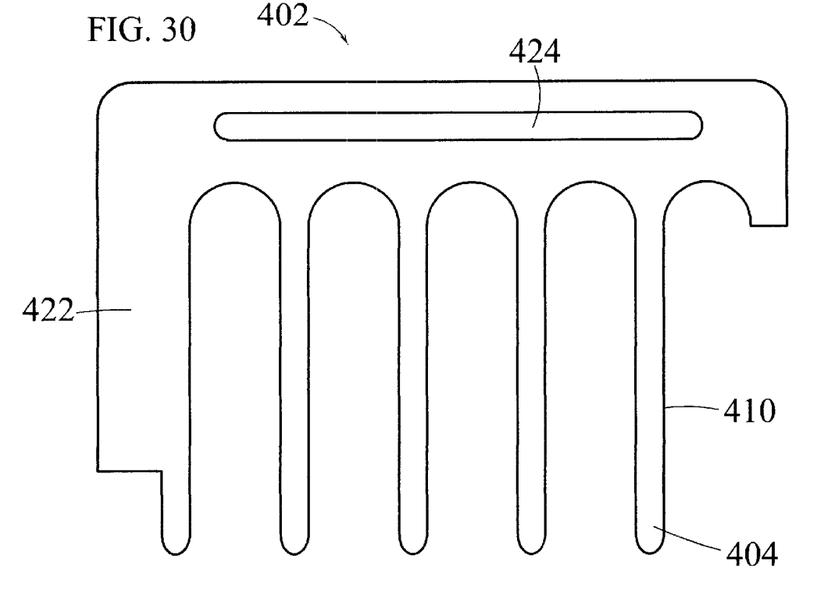
FIG. 30 shows a high k dielectric coated comb shape suitable for use as an upper comb in an inter-digitized tine reactor element in accordance with a single dielectric barrier embodiment of the present invention.

FIG. 30 shows a high k coated comb shape 402 ("upper" comb) similar to the uncoated lower comb 400 of FIG. 29, but having all tine 310 surfaces coated with a high k coating 404.

Figure 31:
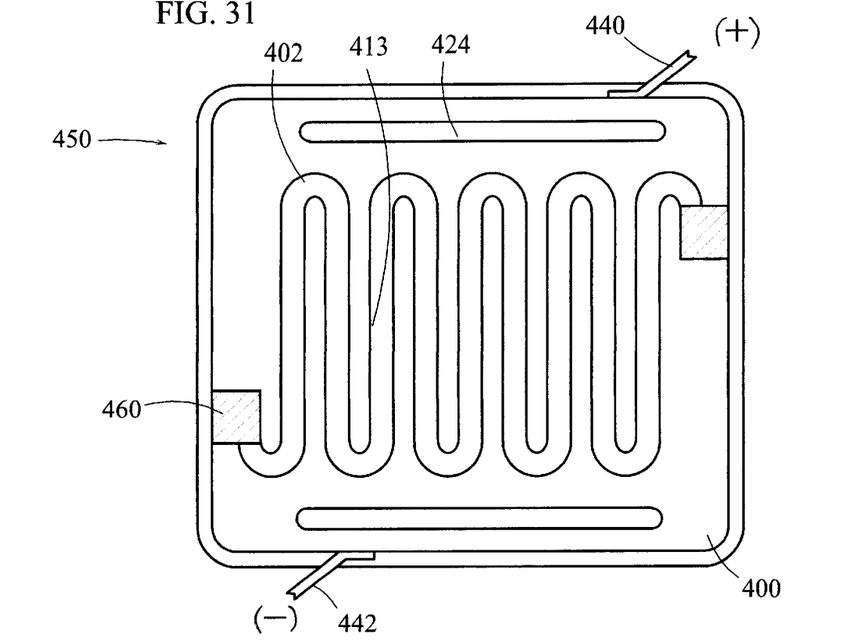
FIG. 31 shows an inter-digitized tine reactor element prepared with the lower comb shape of FIG. 29 and the upper comb shape of FIG. 30.

FIG. 31 shows an inter-digitized tine reactor element 450 prepared by combining and securing the lower and upper comb shapes 400 and 402 shown in FIGS. 29 and 30, preparation and assembly proceeds substantially as described with respect to the double dielectric barrier embodiments, excepting that one comb is coated (402) and one uncoated (400) to provide the single dielectric barrier embodiment. Insulating spacers 460 at joint interfaces isolate each comb from the other. Electrical connections to power 440 and ground 442 are provided to the conductive terminal on each comb. An insulating coating 444 covers the electrical connections.

Figure 32:
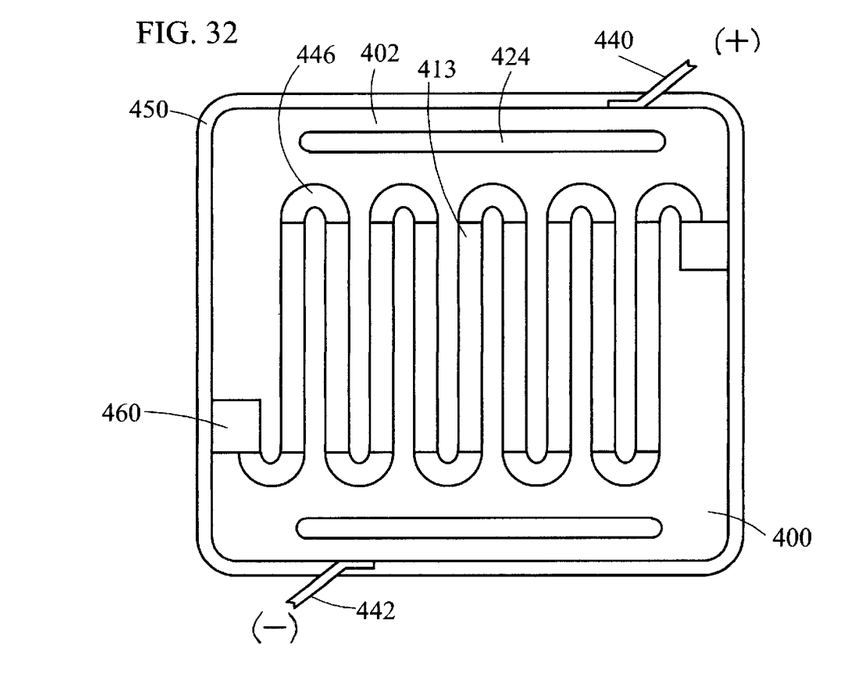
FIG. 32 shows an inter-digitized tine reactor element prepared with insulating guides provided on upper and lower comb shapes.

FIG. 32 shows a preferred embodiment of an inter-digitized tine reactor element 450 having insulating guides 446 at the concentric regions at rounded ends of each tine 410.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A non-thermal plasma reactor having a structural conductor element comprising:
   a base conductor support;
   a dielectric barrier layer supported by and substantially surrounding said base conductor support to form a structural conductor non-thermal plasma reactor element;
   wherein said dielectric barrier layer comprises a lamination layer applied to said base conductor support; and
   said lamination layer comprises an integral deflection flange having a profile providing dielectric barrier deflection and an access point for electrical connection to said base conductor support.

2. The non-thermal plasma reactor of claim 1, wherein said reactor comprises a multi-cell stack comprising a plurality of structural conductor elements wherein said base conductor support is selected from the group consisting of plate shaped structural base conductor supports, C-shaped structural base conductor supports, I-shaped structural base conductor supports, and inter-digitized tine shaped elements comprising at least two comb-shaped structural base conductor supports.

3. The non-thermal plasma reactor of claim 1, wherein said dielectric barrier layer comprises a double dielectric barrier or a single dielectric barrier.

4. The non-thermal plasma reactor of claim 1, wherein said deflection flange is partially closed at opposite ends to minimize the formation of fringing fields.

5. The non-thermal plasma reactor of claim 1, wherein said deflection flange is partially closed at opposite ends to minimize the formation of fringing field and comprises swept regions of a substantially constant thickness at opposite ends of said flange.

6. The non-thermal plasma reactor of claim 1, further comprising:
   a high bonding surface layer disposed on said base conductor support.

7. A non-thermal plasma reactor having a structural conductor element comprising an inter-digitized tine structural conductor element comprising:
   a base conductor support comprising paired comb-shaped structural base conductor supports comprising an exterior surface region and a plurality of tines protruding from a comb-side opposite said exterior surface region; and
   a dielectric barrier layer supported by and substantially surrounding said comb-shaped structural base conductor supports; and
   insulating spacers disposed at joint interfaces.

8. The inter-digitized tine non-thermal plasma reactor of claim 7, further comprising:
   insulating guides disposed at curved end regions of said tines.

9. The inter-digitized tine non-thermal plasma reactor of claim 7, wherein said dielectric barrier layer comprises a double dielectric barrier or a single dielectric barrier.

10. The inter-digitized tine non-thermal plasma reactor of claim 7, wherein said dielectric barrier layer comprises a coating disposed on said comb-shaped structural base conductor supports.

11. The inter-digitized tine non-thermal plasma reactor of claim 7, wherein said dielectric barrier layer comprises a lamination layer applied to said comb-shaped structural base conductor supports.

12. The inter-digitized tine non-thermal plasma reactor of claim 7, wherein said dielectric barrier layer is an integral part of said comb-shaped structural base conductor supports comprising treated outer surfaces of said comb-shaped structural base conductor supports.

13. The inter-digitized tine non-thermal plasma reactor of claim 7, further comprising:
   a high bonding surface layer disposed on said comb-shaped structural base conductor supports.

14. The inter-digitized tine non-thermal plasma reactor of claim 7, wherein said comb-shaped structural base conductor support further comprise a heater slot for accepting a heater.

* * * * *